Patented Sept. 11, 1951

2,567,836

UNITED STATES PATENT OFFICE 2,567,836

POLYMERS OF QUATERNARIZED ACRYL-AMIDO COMPOUNDS AS ANION EXCHANGE RESINS

John A. Anthes, Bridgeville, Pa., assignor to American Cyanamid Company, New York, N. Y., a corporation of Maine No Drawing. Application June 23, 1949, Serial No. 100,968

8 Claims. (Cl. 260—89.7)

This invention relates to anion exchange materials, methods of manufacturing anion exchange materials, and the use of anion exchange materials for the removal of anions from, or the exchange of anions in, liquid media. More particularly, the invention relates to new water-insoluble anion exchange synthetic resins.

It is an object of the present invention to provide a new anion exchange synthetic resin active for the removal of anions from solution.

It is another object of the present invention to provide a process for the preparation of new anion exchange synthetic resins active for the removal of anions from solution.

A further object of the present invention is a process for the purification of liquids by means of new water-insoluble anion exchange synthetic resins.

The above and other objects are attained by the preparation of a polymer of a quaternarized acrylamido compound and by the application of this polymer, in granular or bead form, to the purification of liquids and more particularly, to the purification of aqueous solutions.

The invention will be described in greater detail in conjunction with the following specific example in which proportions are given in parts by weight. The example is merely illustrative and it is not intended that the scope of the invention be restricted to the details therein set forth.

Example 40.4 parts (0.2 mol) of trimethylene dibromide
62.4 parts (0.4 mol) of N-(γ-dimethylaminopropyl) acrylamide
0.5 part of potassium persulfate
60 parts of water The acrylamido compound is dissolved in 50 parts of the water, the trimethylene dibromide is added to the solution, and the resulting mixture is heated to 70° C. An exothermic reaction results and the reaction mixture is cooled in order to maintain the temperature under 90° C. After 5 minutes the two phases have disappeared and a homogeneous solution exists. This is held at 90° C. for an additional 10 minutes. It is then permitted to cool and stand at room temperature, i. e., about 20-25° C., for 15-18 hours after which time the potassium persulfate dissolved in the remaining 10 parts of water is added. The resulting solution is warmed to 40° C. whereupon a very firm, light amber-colored gel is produced. This is dried by heating for 4 hours at 100° C.

The resin so obtained has a salt splitting capacity of 7.5 kilograins as calcium carbonate per cubic foot of resin, a silica capacity of 7.5 kilograins as $SiO_2$ per cubic foot of resin and a capacity for hydrochloric acid of 17.5 kilograins as calcium carbonate per cubic foot of resin.

The present invention is in no sense limited to the use of the N-(γ-dimethylaminopropyl) acrylamide of the example. N-dialkylaminoalkylacrylamides having the following formula are generally suitable for use in the preparation of my new anion exchange resins:

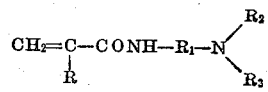

wherein R is hydrogen or methyl, $R_1$ is an alkylene radical of 2 to 8 carbon atoms, and $R_2$ and $R_3$ are alkyl radicals of 1 to 8 carbon atoms. I prefer those compounds wherein $R_1$ has from 2 to 5 carbon atoms and $R_2$ and $R_3$, from 1 to 3 carbon atoms. Some examples of suitable compounds include N-(γ-dimethylaminopropyl) methacrylamide, N - (γ - dimethylaminoethyl) acrylamide, N-(γ-dimethylaminoethyl) methacrylamide, N-(γ-diethylaminopropyl) acrylamide, N-(γ-dimethylaminohexyl) acrylamide, N-(γ-dimethylaminooctyl) methacrylamide, N-(γ-dibutylaminopropyl) acrylamide, N-(γ-dioctylaminobutyl) acrylamide, N-(γ-methylethylaminopropyl) methacrylamide, and the like.

Compounds of the above type may in general be prepared by reaction of N-dialkyl alkylene diamines with acrylyl chloride or methacrylyl chloride. The N-(γ-dimethylaminopropyl) acrylamide of the specific example is readily prepared by reducing the reaction product of dimethylamine and acrylonitrile to produce a diamine, followed by reaction of diamine with acrylyl chloride.

The acrylamido compound must be quaternarized with a difunctional quaternarizing agent in order to provide for cross-linking of the quaternary compound on polymerization. The most suitable of the difunctional agents are the alkylene dihalides of from 2-8 carbon atoms. Thus, in addition to the trimethylene dibromide of 1,3-propylene dibromide of the specific example, propylene dichloride, glycerol dichlorohydrin, butylene dibromide, octylene dibromide, octylene dichloride, ethylene dichloride, and the like may be used.

It is possible to use a monofunctional quaternarizing agent if a polyethylenically unsaturated material is also provided for cross-linking purposes so that in reality a copolymer rather than a polymer of the quaternary compound is formed.

Examples of such monofunctional quaternarizing agents include epichlorohydrin, ethylene oxide, benzyl chloride, allyl chloride, allyl bromide, dimethyl sulfate, diethyl sulfate, and the like.

Furthermore, mixtures of difunctional and monofunctional quaternarizing agents may be used with no polyethylenically unsaturated material if sufficient of the difunctional agent for effecting the necessary cross-linking is provided.

While I do not wish to be limited to any particular theory of the mechanism of the present resin-forming reaction, I believe that either or both of the following reactions takes place during quaternarization:

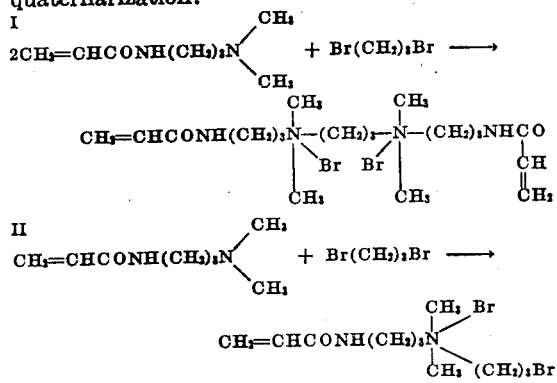

The product of I becomes cross-linked on polymerization; that of II cannot. In II, where the difunctional halide and acrylamido compound are provided in equimolar proportions, the net effect is as if a monofunctional quaternarizing agent were used. Thus it will be apparent that a molar ratio of 1:0.5, acrylamido compound:difunctional halide, represents the optimum theoretical proportions while a 1:1 molar ratio would be unsatisfactory. If less than about 0.3 mol of difunctional halide is used per mol of acrylamido compound, the extent of the resulting incomplete quaternarization seriously impairs the anion exchange activity of the final resin. On the other hand, I have found that to be satisfactory my new anion resins may be polymers of a mixture containing only one mol of a compound of the type resulting from reaction I for every five mols of a compound of the type resulting from reaction II and accordingly a molar ratio of about 1:0.9 is permissible. Therefore, the operating molar proportions should be in the range of from about 1:0.3 to about 1:0.9, acrylamido compound to difunctional halide.

If a monofunctional quaternarizing agent is used in conjunction with a polyethylenically unsaturated cross-linking agent, it serves only as quaternarizing agent and a 1:1 molar ratio of quaternarizing agent to acrylamido compound is the optimum theoretical quantity. Excess of the monofunctional agent will do neither harm nor good; too little will cause incomplete quaternarization and consequent diminished capacity in the final exchange resin.

Corresponding molar ratios may be readily determined if a mixture of difunctional and monofunctional agents are used and they will vary depending upon whether or not polyethylenically unsaturated compounds are supplied for purposes of cross-linking.

The quaternarization reaction may be carried out in the presence of an organic solvent including aromatic hydrocarbons such as benzene, toluene, etc., aliphatic monohydric alcohols including methanol, propanol, etc., glycols including ethylene glycol, diethylene glycol, propylene glycol, 2-methyl-2,4-pentanediol, etc., aliphatic ketones including dimethylketone, methyl ethylketone, etc., and if a monofunctional quaternarizing agent is used under such conditions, the polyethylenically unsaturated compound selected should be one which is soluble in organic solvents such as, for example, divinyl benzene. I prefer effecting the quaternarization reaction, however, in aqueous solution and if a monofunctional quaternarizing agent is used in such a case, the polyethylenically unsaturated material for cross-linking should be one which is soluble in water such as, for example, methylene bis acrylamide, 1,3,5-triacrylylhexahydrotriazine-1,3,5, and the like.

The temperature of, and time required for, the quaternarizing reaction vary with the reactivity of the quaternarizing agent and the particular acrylamido compound. If the reaction is exothermic as in the specific example, it may be necessary to cool the reaction mixture. In other cases, heating for a relatively long period of time may not only be desirable but necessary. The quaternarization reaction is effected in any suitable conventional manner well known to, and well understood by, any skilled chemist.

The polymerization of the quaternarized acrylamido compound is carried out in aqueous solution and is therefore preferably effected by heating in the presence of a water-soluble polymerization catalyst. Suitable water-soluble catalysts, in addition to the potassium persulfate of the example, include hydrogen peroxide, sodium peroxide, acetyl peroxide, benzoyl peroxide, alkali metal percarbonates, alkali metal perborates, diethyl peroxide, soluble salts of perdisulfuric acid as sodium persulfate, and the like. Azo compounds as, for example, $\alpha,\alpha'$-azoisobutyronitrile ("Porophor N") may also be used as may the well-known redox systems comprising combinations of peroxy compounds with oxidizable oxygen-bearing sulfur compounds such as the sulfites, bisulfites, etc., or with sugars. In either of the combinations an activator in the form of traces of silver ion, copper ion, ferricyanide ion, heavy metal salts and the like may be supplied advantageously.

The concentration of catalyst employed is usually small and generally ranges from about 0.1 part catalyst per 1,000 parts of polymerizable material, i. e., 0.01%, to about 2 parts per 100 parts of the polymerizable material, i. e., 2%. If an inhibitor is present in the polymerizable material, up to 5% or more of the catalyst may be necessary.

The polymerizable material need not be heated in order to effect polymerization although this method is generally preferred. Polymerization may be effected by means of heat, light or a combination of the two. In general polymerization temperatures will range from about 20°–25° C. up to about 100° C.

The polymerization may be carried out in dispersion in an organic solvent if beaded resins are desired. In such a case, cationic, anionic or non-ionic surface active agents may be included. Since the quaternarized compounds are water-soluble, the polymerization catalyst used must be at least somewhat water-soluble in order to be effective, regardless of whether or not the polymerization is effected in aqueous solution, as preferred, or in the form of a dispersion in an organic solvent.

The resins prepared according to the present invention may be cured at from about room temperature (20°–25° C.) to about 125° C. I prefer heating at elevated temperatures, i. e., from about 90°–110° C.

It is an advantage of the present invention that by its process a completely quaternarized anion exchange resin may be formed directly. It is surprising that vinyl polymerization may be effected in the presence of quaternary amine groups since basic groups generally inhibit the polymerization of vinyl groups.

The anion active resins prepared in accordance with the present invention may be activated or regenerated by treatment with dilute alkaline solutions such as, for example, 0.1%–10% aqueous solutions of sodium hydroxide, sodium carbonate, ammonium hydroxide, etc.

The resinous materials produced in accordance with this invention are suitable for the removal of anions in general from liquid media. They may be used to extract strong mineral acids (preferably present in relatively low concentrations) as well as weaker inorganic acids such as silica, boric acid, hydrocyanic acid and the like, and organic acids such as acetic acid, oxalic acid, etc. from aqueous and other solutions. The anions of salts such as the chloride ion in ammonium chloride or the sulfate ion in ammonium sulfate may be removed by means of my new anion exchange products.

Thus, the anion active resins are useful for many purposes, examples of which are removal of acids from water and from alcoholic solutions, the purification of sugar solutions including cane and beet sugar solutions, molasses, grapefruit, pineapple and other fruit waste, the purification of pectin, gelatin, formaldehyde solutions, etc.

While my new resins are especially suitable for the removal of anions from aqueous media, they may be also used to extract acids or anions from liquid media, and they may even be used for the extraction of acids from gases.

To be sufficiently insoluble for practical use in the water purification art, resins should have a sufficiently low solubility that they will not be dissolved by the solution being treated. Thus 1000 parts of water should not dissolve more than 1 part of the resin when water is passed through a bed of resin after the first cycle comprising an activation, exhaustion and reactivation of the resin.

While my invention is not in any sense limited thereto I prefer to use products of a particle size of from about 8 to about 60 mesh, screened dry on a U. S. standard screen. These may be ground to size, or they may be prepared in beaded form.

It is a particular advantage of the anion exchange resins of the present invention that they possess a good capacity for the removal of silica and other weak acids such as hydrocyanic acid from aqueous solutions.

I claim:

1. An anion active resin suitable for the exchange of anions in, and the removal of anions from, liquid media which is a water-insoluble polymer of a compound obtained by quaternarizing with an alkylene dihalide of from 2 to 8 carbon atoms an acrylamido compound having the following general formula:

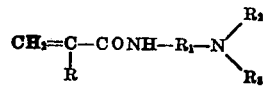

wherein R is selected from the group consisting of hydrogen and methyl, $R_1$ is an alkylene radical of from 2 to 8 carbon atoms, and $R_2$ and $R_3$ are each an alkyl radical of from 1 to 8 carbon atoms.

2. An anion active resin suitable for the exchange of anions in, and the removal of anions from, liquid media which is a water-insoluble polymer of the compound obtained by quaternarizing N-(γ-dimethylaminopropyl) acrylamide with an alkylene dihalide of from 2 to 8 carbon atoms.

3. An anion active resin suitable for the exchange of anions in, and the removal of anions from, liquid media which is a water-insoluble polymer of the compound obtained by quaternarizing N-(γ-dimethylaminopropyl) acrylamide with 1,3-propylene dibromide.

4. A process which comprises quaternarizing a compound having the general formula:

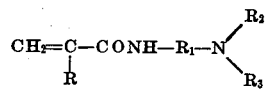

wherein R is selected from the group consisting of hydrogen and methyl, $R_1$ is an alkylene radical of from 2 to 8 carbon atoms, and $R_2$ and $R_3$ are each an alkyl radical of from 1 to 8 carbon atoms, with an alkylene dihalide of from 2 to 8 carbon atoms, and polymerizing the resulting quaternary compound in the presence of a water-soluble polymerization catalyst.

5. A process which comprises treating N-(γ-dimethylaminopropyl) acrylamide with an alkylene dihalide of from 2 to 8 carbon atoms and polymerizing the resulting quaternary compound in the presence of a water-soluble polymerization catalyst.

6. A process as in claim 5 wherein the alkylene dihalide is 1,3-propylene dibromide.

7. A process which comprises quaternarizing a compound having the general formula:

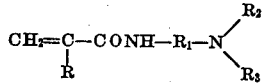

wherein R is selected from the group consisting of hydrogen and methyl, $R_1$ is an alkylene radical of from 2 to 8 carbon atoms, and $R_2$ and $R_3$ are each an alkyl radical of from 1 to 8 carbon atoms, with an alkylene dihalide of from 2 to 8 carbon atoms, polymerizing the resulting quaternary compound in the presence of a water-soluble polymerization catalyst, permitting the polymerized product to gel, and curing the gel by heating.

8. A process which comprises treating N-(γ-dimethylaminopropyl) acrylamide with an alkylene dihalide of from 2 to 8 carbon atoms, polymerizing the resulting quaternary compound in the presence of a water-soluble polymerization catalyst, permitting the polymerized product to gel, and curing the gel by heating.

JOHN A. ANTHES.

REFERENCES CITED

The following references are of record in the file of this patent:

UNITED STATES PATENTS

| Number | Name | Date |
|---|---|---|
| 2,228,514 | Griessbach et al. | Jan. 14, 1941 |
| 2,311,548 | Jacobson | Feb. 16, 1943 |
| 2,456,428 | Parker | Dec. 14, 1948 |
| 2,469,683 | Dudley et al. | May 10, 1949 |